United States Patent [19]

Arends

[11] 3,914,923
[45] Oct. 28, 1975

[54] PLANT TOPPING APPARATUS
[75] Inventor: Kenneth W. Arends, Willmar, Minn.
[73] Assignee: Waycrosse, Inc., Minneapolis, Minn.
[22] Filed: July 1, 1971
[21] Appl. No.: 158,874

[52] U.S. Cl. .................................................... 56/63
[51] Int. Cl.² ....................................... A01D 45/02
[58] Field of Search ..................... 56/53, 58, 63, 500

[56] References Cited
UNITED STATES PATENTS

| | | | |
|---|---|---|---|
| 657,411 | 9/1900 | Hamm | 56/500 |
| 1,443,872 | 1/1923 | Davis et al. | 56/58 |
| 2,621,460 | 12/1952 | Haapala | 56/53 X |
| 2,631,419 | 3/1953 | Craft | 56/500 |
| 2,632,988 | 3/1953 | Pollard et al. | 56/500 |

*Primary Examiner*—Russell R. Kinsey
*Assistant Examiner*—J. N. Eskovitz
*Attorney, Agent, or Firm*—Dorsey, Marquart, Windhorst, West & Halladay

[57] ABSTRACT

An improved plant topping apparatus of the type shown in U.S. Pat. No. 3,025,653, in which a cutting blade moves along a row of plants in a cutting plane which extends transversely across the row and is inclined forwardly and downwardly along the row at approximately 30° from the vertical, and in which a tapered guide housing extends forwardly and upwardly from the cutting plane. The guide housing has a top wall inclined along a straight line extending forwardly and upwardly from the cutting plane. The housing also has transversely spaced side walls extending downwardly from the top wall along opposite sides of the row and diverging forwardly from the cutting plane. Preferred angular orientations and relative positions of certain parts help provide precise and efficient removal of predetermined lengths from the tops of plant stalks of different relative heights in the same row.

3 Claims, 5 Drawing Figures

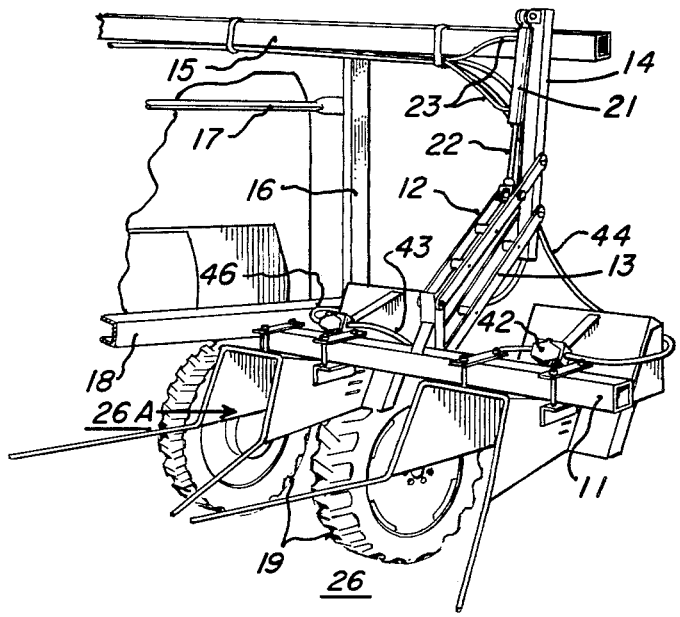
FIG. 1.
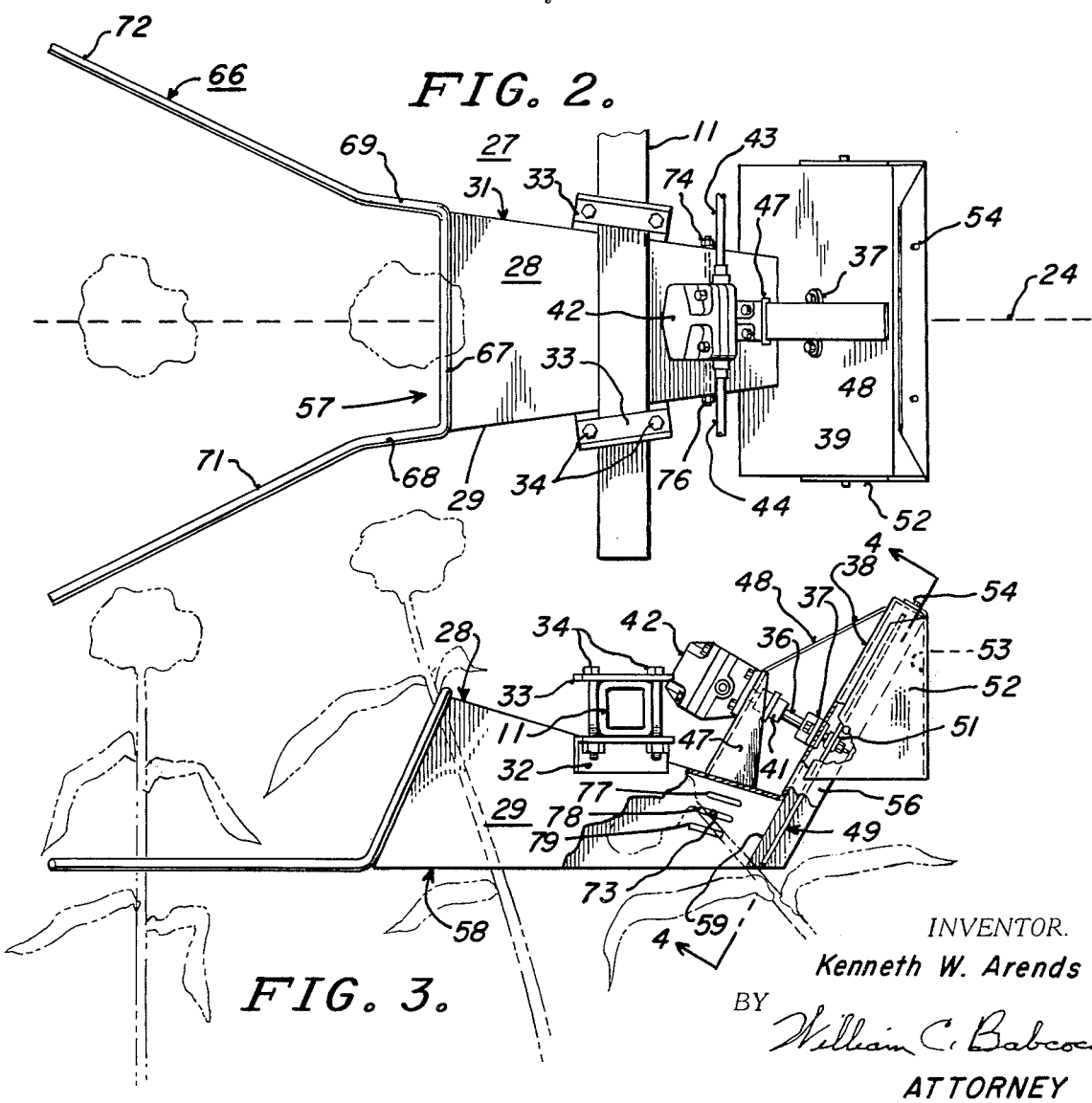
FIG. 2.
FIG. 3.
INVENTOR.
Kenneth W. Arends
BY William C. Babcock
ATTORNEY INVENTOR.
Kenneth W. Arends
BY William C. Babcock
ATTORNEY

PLANT TOPPING APPARATUS

BACKGROUND OF THE INVENTION

Various machines are known, which are designed to cut off the tops of various plants, such as the tassels and upper stalks from corn. Some of these machines merely cut all such stalks at a uniform preset height above the ground. Other machines are said to cut the stalks in such a way that a uniform length of stalk will be removed from the top of each plant along a given row, even though the individual plants in that row have grown to different heights. This has been accomplished previously by bending at least the upper portions of such plant stalks fowardly as a topping machine moves along the row and then cutting these stalks by means of a cutting blade located a predetermined distance from that portion of the machine which holds the stalks in bent position. Various individual bending and guide means for such stalks, and various arrangements of cutting members, have been separately proposed, for example, in the following U.S. Pat. Nos.: Hail, 968,655; Brown, 1,054,822; Davis, 1,443,872; and Ackermann, 3,025,653. In U.S. Pat. No. 3,025,653, a cutting blade is movable along a row of plants in a cutting plane which extends transversely across such a row of plants and is inclined forwardly in the direction of movement of the machine and downwardly at approximately 30° from the vertical.

SUMMARY OF THE INVENTION

The present invention provides an improved plant topping machine in which a preferred orientation of the cutting plane of a suitable cutting blade is combined with an improved guide housing extending forwardly and upwardly from the cutting plane. The guide housing provides an open-bottomed channel defined by a top wall, which extends forwardly and transversely above a plant row and which is inclined along a line extending forwardly and upwardly from the cutting plane, in combination with side walls extending downwardly from the top wall along opposite sides of the plant row, with such side walls diverging from each other as they extend forwardly from the cutting plane. The guide housing thus provides a tapered or converging shield which engages the upper portions of the plants, bends them forwardly as the machine moves along the row, guides the upper stalk portions into a desired angular position with reference to the cutting plane, and holds each stalk against undesired lateral movement when it is engaged by a blade moving in the cutting plane. Thus the cutting blade severs the stalk at the desired preselected distance from the top of the plant. In the topping of corn stalks in the United States, for eample, such stalks normally have five leaves on a normal stalk above the uppermost ear of corn. It is desirable in topping such corn plants to cut off only one or two of the uppermost leaves, thus leaving three or more of the leaves above the ear of corn, in order to maintain the desired growth for the rest of the plant. The combination of cutting blade orientation and guide housing shape and orientation according to the present invention makes it possible to achieve the desired degree of precision and efficiency in severing the upper portions of corn stalks or other plants and to adjust, within reasonable limits, the length of stalk to be removed from the top of such a plant.

BRIEF DESCRIPTION OF THE DRAWING

In the drawings which form a part of this application, and in which like reference characters indicate like parts, FIG. 1 is a partial perspective view of a plant topping machine incorporating improved features according to the present invention;

FIG. 2 is a top plan view of one of the individual row topping units of the device of FIG. 1;

FIG. 3 is a side elevation of the unit of FIG. 2, showing further details of the improved combination;

DESCRIPTION OF THE PREFERRED EMBODIMENT

Figure 4:
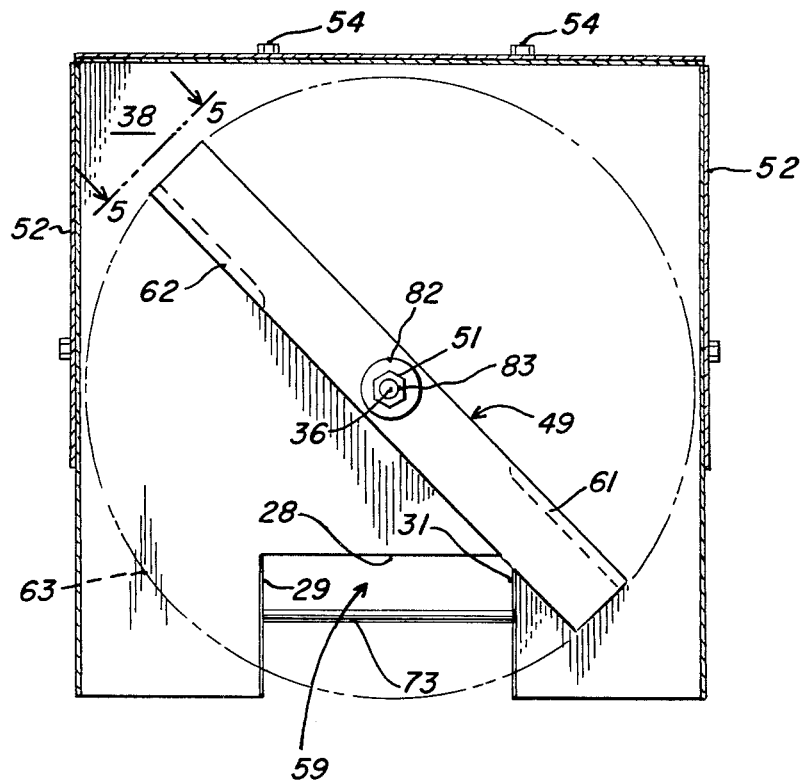
FIG. 4 is an enlarged sectional view taken on the line 4—4 of FIG. 3.

As shown in partial perspective in FIG. 1, the plant topping machine of the present invention includes a substantially horizontal frame or support member 11 adapted to extend transversely across a row of plants, and to be moved longitudinally along the row of plants. For this purpose, the support member 11 is adjustably carried by upper and lower parallel support arms 12 and 13 which are secured to a vertical post 14 depending from a horizontal cross frame member 15 of a suitable tractor unit. Frame member 15, for example, may be supported vertically above the ground by frame members 16, 17 and 18, which in turn are suitably connected to the remainder of a tractor-type vehicle (not shown). These supporting frame members may be supported directly by rear wheel members 19, or the entire frame assembly may be supported in cantilever fashion by the connection of members 17 and 18 or the like to the main body of such a tractor.

In any event, the machine is designed for relative movement along a row of plants which are to be topped, such as a row of corn from which the upper tassel portion is to be removed.

The relative vertical height of frame member 11 above such a row is adjusted through the parallel linkage arms 12 and 13 by a suitable hydraulic power cylinder 21 secured to frame member 14. Cylinder 21 has a piston which is connected at 22 to lever arm 12. Hydraulic lines 23 control the position of the piston in the cylinder 21 and thereby control the relative angular position of arms 12 and 13 to establish frame member 11 at the desired height above the ground. As shown in FIGS. 2 and 3, frame member 11 is thus adapted to move along a path corresponding to a row of plants shown schematically by the dotted line 24 in FIG. 2. One or more machine cutting units 26, 26A according to the present invention will be secured to the cross frame member 11 so that each such unit is positioned above a desired plant row. Each such unit includes a guide housing indicated generally at 27, which includes a top wall 28 and side walls 29 and 31 respectively. Brackets 32 welded to the side walls 29 and 31, in combination with clamps 33 and bolts 34, provide a means for securing each cutting machine to frame member 11.

The machine unit 26 includes a rotary shaft 36 for a suitable cutting blade. Shaft 36 is supported in a bearing member 37 carried by an upwardly and rearwardly inclined transverse wall member 38, welded or otherwise secured at 39 to the rear end of the guide housing 27. Shaft 36 extends generally longitudinally along the direction of plant row 24, but is inclined as shown in FIG. 3 to support a cutting blade in a specified angularly oriented cutting plane. Shaft 36 is connected through a flexible coupling 41 to the shaft of a hydraulic motor 42 which is supplied by a high pressure hydraulic source through suitable connections 43 and 44. As shown in FIG. 1, the hydraulic motors of the adjacent units 26 and 26A may, if desired, be connected in series by hydraulic lines 43, 44 and 46.

As shown in FIG. 3, motor 42 is supported on a bracket 47 secured to the top wall 28 of guide housing 27. Thus the motor, the shaft 36, and the guide housing are all relatively fixed with respect to each other and are all effectively supported by frame member 11 at whatever desired height is selected for the positioning of member 11 by hydraulic cylinder 21. The parallel linkage 12, 13 insures that the units will maintain the relative angular orientation shown in FIG. 3 at all times, regardless of vertical adjustment of the relative height of the unit and its supporting frame member 11. A brace 48 between the upper end of motor supporting bracket 47 and the upper portion of plate 38 further provides the desired rigidity of construction.

A suitable cutting blade 49 is secured at 51 to shaft 36 and thus rotates in a cutting plane which is further specified below, and which may be considered as essentially perpendicular to the plane of the drawing in FIG. 3 and intersecting such plane along the line defined by the blade number 49.

An upper blade shield member includes side walls 52 and a rear wall 53 which cooperate with the front inclined plate member 38 to provide an enclosure for the upper portion of the rotating cutting blade 49 above shaft 36. Thus, an extension of rear wall 53 is secured at 54 to an upper flange of member 38. Side walls 52 of the blade shield are suitably secured to side flanges 56 of plate member 38 to complete the desired upper blade enclosure. Thus a blade housing portion is provided forwardly of the cutting plane which shields all portions of the cutting blade outside the guide housing from accidental engagement at the front or sides of the blade.

The top and side walls 28, 29 and 31 of guide housing 27 are specifically oriented to provide an open-bottomed, tapered guide channel designated generally at 57, which is moved along the desired row of plants just ahead of the cutting blade, and which serves for preliminary engagement and forward bending of the plant tops to be removed, in the manner shown generally in FIG. 3. The lower edges of this channel are defined by the essentially horizontal longitudinally extending bottom edges 58 of side walls 29 and 31. As shown in FIGS. 2 and 3, this open-bottomed channel converges both vertically and laterally from front to rear to position properly the upper stalk portions at the preferred longitudinal angle for effective action by inclined cutting blade 49. Thus the blade slices through the stalk in a plane generally perpendicular to the stalk, or at least close enough to such perpendicular to minimize the total stalk cross-sectional area to be severed by the knife, while the stalk is held against lateral movement.

According to the present invention, the relative angular orientation and location of the cutting blade and its associated guide housing walls are specifically selected to provide improved efficiency and precision in the trimming of predetermined lengths from the top of each stalk, even though successive plants may be of somewhat different height, as illustrated by the two plant portions at the left of FIG. 3. First of all, as shown in U.S. Pat. No. 3,025,653, the angular orientation of shaft 36 and its cutting blade 49 are selected so that the cutting plane of the blade extends transversely across the row of plants and is inclined forwardly and downwardly at an angle of approximately 30° from the vertical. Certain advantages of this angular orientation are described in the earlier patent. In combination with this previously suggested angular orientation of such a cutting blade, the present invention provides a tapered guide housing, as described, in which the top wall extends forwardly and transversely above the row of plants and is inclined along a generally straight line which extends forwardly and upwardly from the cutting plane of blade 49. The angle of inclination is believed to have a critical relationship to the orientation of the cutting plane. In the preferred form of the invention, this upper wall 28 is inclined forwardly and upwardly at an angle of substantially (15°) above the horizontal. While some variation of this preferred angle can be tolerated, it is my belief that the angle should be less than 30° above the horizontal, and that a practical working range from ten to twenty degrees above the horizontal represents the recommended limit of variation from the specific preferred angle of fifteen degrees.

As further shown in FIGS. 2 and 3, the side walls 29 and 31 are not parallel to each other, but extend forwardly from the cutting plane in directions which diverge forwardly and outwardly from each other. Thus the open-bottomed channel 57 which is provided by the top wall 28 asnd side walls 29 and 31 has its respective side walls spaced apart by a substantially greater distance at the forward end of the guide housing than at the rear end, where the rear edges of the housing provide an inverted U-shaped opening at 59 just ahead of the cutting plane of blade 49. At this point, the converging side walls are preferably spaced apart a distance of substantially seven inches, in order that a plant stalk and its associated leaves and tassel portions will be restrained against substantial lateral movement at the time when the cutting blade 49 finally engages the stalk to sever the top portion. Here again some limited variation can be tolerated.

As shown in FIG. 4, cutting blade 49 extends radially in opposite diametric directions from the point 51 at which it is secured to shaft 36. Opposite edge portions 61 and 62 are suitably beveled or sharpened to provide cutting edges which move in a cutting plane as indicated by the dotted line 63 in FIG. 4. The axis of shaft 36 is preferably spaced a substantial distance (e.g. four inches) above the top wall 28 of the guide housing, and well above the area of the rear opening 59 in the housing. Thus a relatively long cutting blade 49 (e.g. with a radial length of eight inches for each diametrically opposed blade portion) is utilized, and the cutting path of its cutting edges 61, 62 is oriented to extend across substantially the entire cross-sectional housing area at 59, i.e., at the intersection of the open-bottomed channel 57 and the cutting plane. This arrangement provides an effective cutting action as the cutting edges 61 and 62 of blade 49 engage a plant stalk which finally reaches the cutting plane after it is guided into the desired angular cutting position by the particular angular arrangement of the guide housing.

Figure 5:
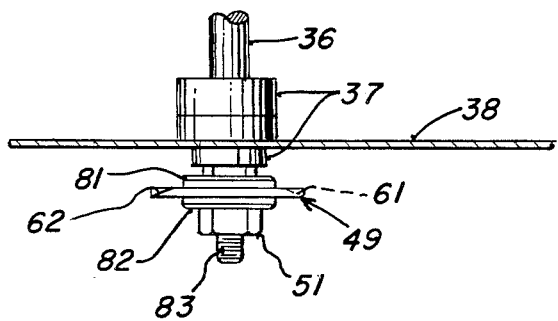
FIG. 5 is a partial sectional view on the line 5—5 of FIG. 4.

FIG. 5 shows details of the manner in which cutting blade 49 is secured to its shaft 36 and supported by bearing member 37 on wall portion 38. The shaft 36 extends through such bearing and wall portions and supports cutting blade 49 at its rear or outer end. Blade 49 is clamped to shaft 36 between the supporting washers 81 and 82, all of which are secured in position by fastening means 51, which is illustrated as a nut secured to the threaded end 83 of shaft 36. The blade and shaft may be keyed to each other or provided with appropriate non-circular sections to insure rotation of the blade 49 with the shaft 36 at all times. The end 83 of shaft 36 is preferably cut away along opposite sides to provide the desired non-circular section as well as a shoulder against which washer 81, blade 49, and washer 82 may be securely clamped by nut 51.

Although the particular angle at which the side walls 29 and 31 diverge forwardly from each other ahead of the cutting plane is believed to be less critical than the angular orientation of top wall 29, the illustrated machine has been found to operate satisfactorily with a preferred angle of divergence of substantially 15° between the respective side walls. Thus, each side wall diverges outwardly from the longitudinal direction of row 24 at an angle of substantially 7½° Some variation may be tolerated as a practical matter, but it is believed that the angle of divergence should be at least 10°, so that the side walls 29 and 31 will be spaced far enough apart at their forward edges to accommodate some lateral variation in relative machine and plant positions along row 24. All plants, for example, may not extend vertically in exact alignment with the theoretical straight line of row 24 (FIG. 2). Moreover, as the machine is driven along such a row, its lateral position relative to the row of plants may be varied by reason of terrain variations or operator error.

To further insure the proper engagement of each plant top with the guide housing 27, the machine is provided with a supplemental guide member 66 which extends forwardly from the housing 27. In its preferred form, guide member 66 has a central inverted U-shaped portion 67, 68, 69 which fits the front edges of the top and side walls 28, 29 and 31. Thus, the guide member portion 67 fits the front edge of top wall 29, while downwardly extending portions 68 and 69 fit along the front edges of the respective side walls 29 and 31. These guide member portions may be welded into position and provide a smooth finished edge for the front of housing 27.

The guide member 66 further includes forwardly extending guide arms 71 and 72 which diverge forwardly from each other at an angle substantially greater than the angle of divergence of the housing side walls. In the preferred machine shown in the drawings, these guide arms 71 and 72 diverge forwardly from each other at an angle of essentially 50°, i.e. 25° at each respective side of the longitudinal path 24. The forward ends of guide arms 71 and 72 are thus spaced apart a substantially greater distance than the forward edges of side walls 29 and 31. This spacing is much greater than any expected lateral variation in the relative machine and plant positions along a row, and may be as great as 40 inches. As shown in FIG. 3, these forwardly extending guide arms 71 and 72 extend along a substantially horizontal plane, just as if they were extensions of the bottom edges 58 of the respective housing side walls 29 and 31.

The construction just described, and particularly the specified relative angular orientations and locations of the cutting plane of blade 49 and the walls of guide housing 27 provide a novel combination of basic elements for effective removal of predetermined lengths from the top of plants such as cornstalks. It has been separately recognized in the prior art, in connection with some older devices, that some means of adjusting the degree of forward bending of individual plant stalks may be helpful in controlling the exact length to be severed. For this purpose, vertically and longitudinally adjustable cross bars have been shown in the previously mentioned patents to Hail, Brown and Davis.

To provide possible added flexibility in operation of the machines according to the present invention, such an adjustable plant-engaging cross bar 73 is located within the guide housing 27 and extends transversely across the row 24. This cross bar is held in position by manually adjustable supporting means, which permits selective adjustment of the cross bar position within the guide housing in at least one direction below the top wall and forwardly of the cutting plane. Specifically, the cross bar position may be selectively adjusted both vertically below the top wall and horizontally ahead of the cutting plane. For this purpose, cross bar 73 is clamped in an adjusted position by nuts 74 and 76 on its threaded outer ends. These nuts engage the side walls 29 and 31 of the housing and hold the cross bar in one or the other of a plurality of slots 77, 78 and 79, which are respectively spaced at different distances below top wall 28 of the guide housing. These slots extend generally parallel to top wall 29 for a few inches, at a location somewhat ahead of the cutting plane of blade 49. Thus, the crossbar may be adjustably secured at somewhat different vertical heights and at somewhat different longitudinal positions, depending upon such factors as the length to be removed from the top of the stalk, the relative flexibility of the stalk top, the relative height of the machine above the ground, and the total height of the plant.

Thus the specific addition of such an adjustable cross bar, in combination with the particular thirty degree cutting plane orientation and specified angular arrangement of the tapered guide housing of the present invention, is believed to further enhance the operating advantages of this embodiment.

The foregoing specification accordingly describes the background and nature of the present invention and the manner in which it may be practiced. While some variations in the details of the construction shown and described may be apparent to persons skilled in the art, the preferred embodiment shown and described herein includes the combination of specific angular orientations and relative locations of cutting blade and guide housing features which represent the best mode presently contemplated for carrying out the invention.

I claim:

1. In a machine for removing the tops of leaf-bearing plants in which the machine includes a groundengaging supporting member, a frame member mounted above the ground-engaging member and supported thereby for forward movement along a path spaced above the ground and corresponding to a row of such plants, and at least one cutting blade rotatably supported with respect to the frame member for rotation of the blade in a cutting plane extending transversely above such a row and inclined forwardly and downwardly at approximately 30° from the vertical, said blade being mounted on the frame member at a location spaced above the ground at a height adapted to sever only the uppermost portions of the plants, the improvement comprising, in combination with such blade location and cutting plane orientation, a guide housing extending forwardly from said cutting plane above said row, the guide housing comprising a top wall extending forwardly and transversely above said row and inclined forwardly and upwardly from the blade and cutting plane at an angle in the range from 10° to 20° above the horizontal, and transversely spaced side walls extending downwardly from said top wall along opposite sides of said row and diverging forwardly from the cutting plane, said top and side walls defining an open-bottomed, rearwardly converging and downwardly inclined channel spaced above the ground at a height where it engages only the uppermost portions of the plant tops and leaves for preliminary engagement and foward bending of the plant tops to an angular cutting position at the cutting plane for cutting engagement by the blade and removal of only predetermined portions from the plant tops while the remaining portion of each plant and most of the leaves are left for growth in such row, said machine having a plant-engaging crossbar extending transversely above said row within the guide housing, and manually adjustable supporting means holding the crossbar within the housing, the adjustable supporting means providing selective adjustment of the crossbar position within the housing in at least one direction below the top wall and forwardly of the cutting plane.

2. A machine according to claim 1 in which the adjustable supporting means includes means providing selective adjustment of the crossbar position both vertically below the top wall and horizontally ahead of the cutting plane.

3. A machine according to claim 2 in which the side walls have longitudinally extending horizontal bottom edges serving as lower edges of the open-bottomed channel, and in which the adjustable supporting means provides selective adjustment of the corssbar at positions of different height above said lower edges.

* * * * *

UNITED STATES PATENT OFFICE
CERTIFICATE OF CORRECTION

PATENT NO. : 3,914,923
DATED : October 28, 1975
INVENTOR(S) : Kenneth W. Arends

It is certified that error appears in the above-identified patent and that said Letters Patent are hereby corrected as shown below:

Column 1, line 54, "eample" should be "example";

Column 4, line 34, "asnd" should be "and"; and

Column 6, line 32, "29" should be "28".

Signed and Sealed this twentieth Day of April 1976

[SEAL]

Attest:

RUTH C. MASON
Attesting Officer

C. MARSHALL DANN
Commissioner of Patents and Trademarks